UNITED STATES PATENT OFFICE.

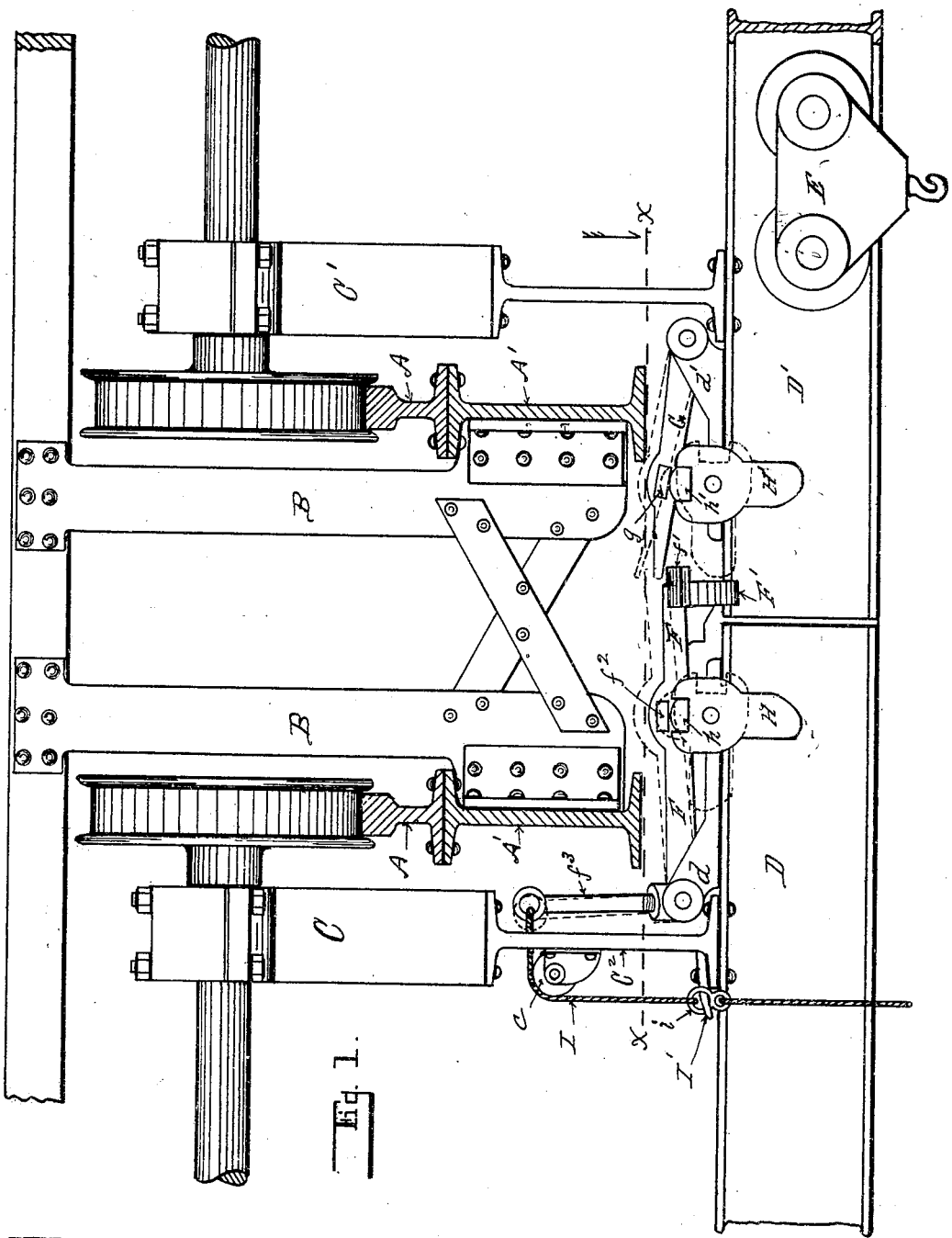

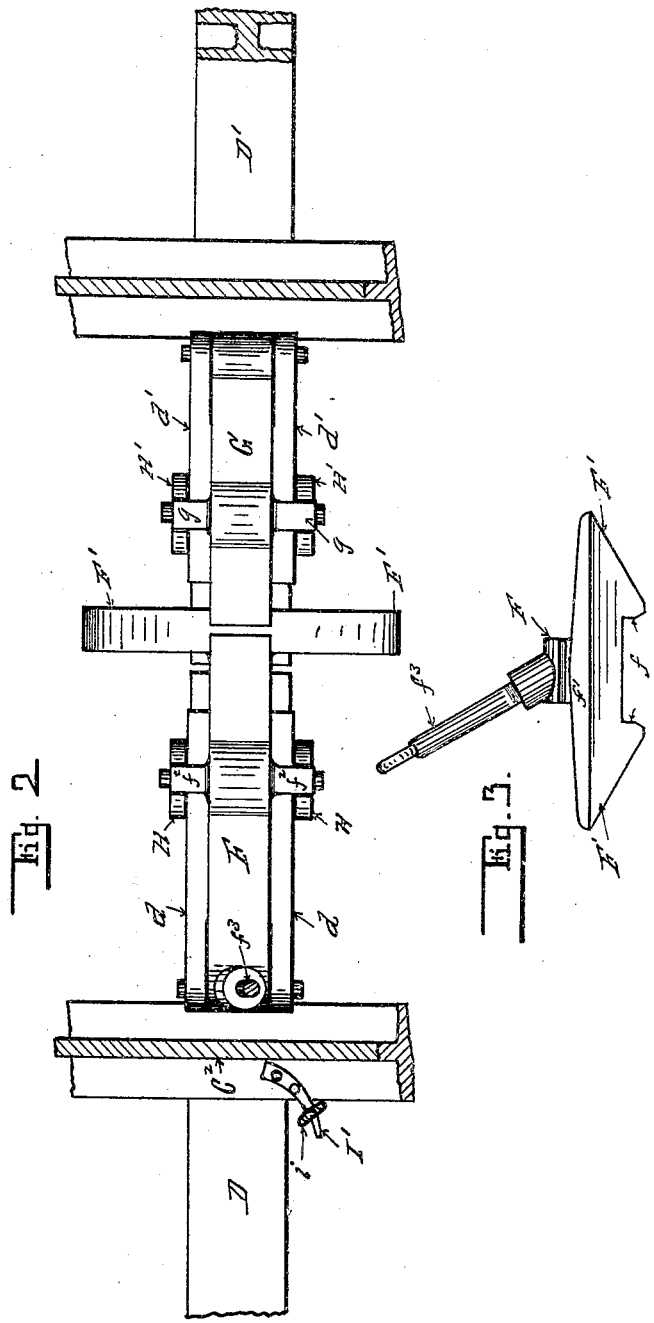

JOHN R. WHITTEMORE, OF ERIE, PENNSYLVANIA.

CRANE-LOCKING MECHANISM.

No. 809,482.　　　　　Specification of Letters Patent.　　　　　Patented Jan. 9, 1906.

Application filed June 9, 1905. Serial No. 264,485.

*To all whom it may concern:*

Be it known that I, JOHN R. WHITTEMORE, a citizen of the United States, residing at Erie, in the county of Erie and State of Pennsylvania, have invented certain new and useful Improvements in Crane-Locking Mechanism; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to crane-locking mechanism, and has for its object the construction of a mechanism adapted to lock two crane mechanisms together, so that trolley-hoists operating thereon can be transferred from one crane to the other and also operate when the cranes are not locked together as stops to prevent the trolley-hoists from being run off from the ends of the trolley-hoist tracks on said cranes.

The features of this invention are hereinafter fully set forth, and explained and illustrated in the accompanying drawings, in which—

Figure 1 is a view in elevation of parts of two traveling-crane mechanisms embodying my invention. Fig. 2 is a horizontal section of the same on the line $x\,x$ in Fig. 1. Fig. 3 is an end view of the locking-lever of my device.

In the drawings, A A' are two tracks and track-supports for two traveling cranes, which tracks and track-supports are preferably supported by brackets B in the usual manner, and upon which tracks A traveling cranes C and C' operate in the usual manner. To each of these cranes there are secured transverse trolley-hoist tracks D and D', upon which trolley-hoists E are adapted to operate in the usual manner.

On a bracket $d$, on the top of one of the trolley-hoist tracks D, I pivot a locking-lever F. The outer end of this lever F extends beyond the end of the track D and is provided with transverse extensions F' and has in its under surface a central notch or slot $f$, from which the under edges of the extensions F' incline upward toward the outer ends thereof, so that when the track D is moved past the end of the track D', or vice versa, the top of the track D' will strike one of the inclined surfaces of one of the extensions F' on the locking-lever F and raise it until the top of the track D' is opposite the notch or slot $f$, when the locking-lever F will fall by gravity, so that the notch $f$ will engage the top of the track D' and lock the two tracks together, as illustrated in Figs. 1 and 2.

On a bracket $d'$ on the top of the track D' there is pivoted a lever-latch G, the outer end of which is adapted to be engaged by an extension $f'$ on the top of the transverse extensions F' on the locking-lever F and be raised thereby, as illustrated in Fig. 1.

Pivoted to the brackets $d$ and $d'$ under the locking-lever F and lever-latch G there are swinging stops H and H', having notches $h$ and $h'$ in the tops thereof, with which the lugs $f^2$ on the locking-lever and the lugs $g$ on the lever-latch are adapted to engage when the locking-lever and lever-latch are at their lowermost point of movement, and when so engaged the swinging stops H and H' are firmly retained in a vertical position, so as to prevent a trolley-hoist E from traveling off of the ends of the tracks D and D'. When, however, the locking-lever F is raised sufficiently to lift the lugs $f^2$ out of the notches $h$ on the swinging stops H, but not enough to disconnect the locking-slot $f$ from the top of the track D', as illustrated in Fig. 1, it also likewise lifts the lever-latch G, so as to raise the lugs $g$ thereon out of the notches $h'$ in the swinging stops H', so that the stops H and H' are free to be swung out of the way by a trolley-hoist E passing along the tracks D and D', the said tracks still remaining locked together.

For operating this mechanism there is an upwardly-projecting arm $f^3$ on the locking-lever F, from which a cord I extends over a pulley $c$, which cord is provided with a loop or ring $i$, adapted to engage a stop or hook I' on the support $C^2$ of the trolley-hoist track D and retain the locking-lever mechanism in the partially-raised position, (illustrated in Fig. 1;) but when it is desired to raise the locking-lever mechanism farther, so as to unlock the tracks D and D' from each other, the ring $i$ is removed from the stop I' and the cord pulled farther downward, and when the cranes are moved apart and the cord released the locking-lever falls to its lowermost position, and the swinging stops H are thereby firmly locked in a vertical position, and the lever-latch G, having passed off of the end of the locking-lever F, also falls by gravity to its lowest position and locks the swinging stops H' in a vertical position, so that they will operate as trolley-hoist stops.

Having thus described my improved mechanism, so as to enable others to construct and operate the same, what I claim as new, and desire to secure by Letters Patent of the United States, is—

1. In a locking device for cranes, a locking-lever pivoted to one crane and adapted to engage another crane, a trolley-hoist stop adapted to be engaged by the locking-lever, and means for operating the locking-lever, substantially as set forth.

2. In a locking mechanism for cranes, a locking-lever pivoted to the trolley-hoist track of one crane, and adapted to engage the trolley-hoist track of another crane, a lever-latch on said other crane adapted to be engaged and raised by said locking-lever, trolley-hoist stops secured to both trolley-hoist crane-tracks, means on said locking-lever and said lever-latch for engaging and locking said stops, and means for raising said locking-lever, substantially as set forth.

3. The combination of two cranes, transverse trolley-hoist tracks on both of said cranes adapted to be brought into coincidence, a locking-lever pivoted on the trolley-hoist track of one crane and projecting beyond the end thereof, inclined lateral projections on the end of the locking-lever having a slot between them adapted to automatically engage the top of the trolley-hoist track of the other crane when the two cranes are brought into coincidence, a lever-latch pivoted to the top of the trolley-hoist track on the second crane adapted to be engaged and raised by the end of the locking-lever on the trolley-hoist track of the first-named crane, swinging trolley-hoist stops pivoted on the top of both trolley-hoist tracks under the locking-lever and lever-latch thereon, lugs on said locking-lever and said lever-latch adapted to engage notches in said swinging stops, and means for raising the locking-lever and the lever-latch so as to release said swinging stops without unlocking the trolley-hoist tracks from each other, substantially as set forth.

In testimony whereof I affix my signature in presence of two witnesses.

JOHN R. WHITTEMORE.

Witnesses:
H. M. STURGEON,
W. P. GIFFORD.